US011962961B2

(12) United States Patent
Xu et al.

(10) Patent No.: US 11,962,961 B2
(45) Date of Patent: Apr. 16, 2024

(54) REAR SHELL OF DISPLAY DEVICE AND DISPLAY DEVICE

(71) Applicants: Hefei BOE Vision-Electronic Technology Co., Ltd., Anhui (CN); BOE Technology Group Co., Ltd., Beijing (CN)

(72) Inventors: Hanqun Xu, Beijing (CN); Yanbiao Li, Beijing (CN); Shengren Dou, Beijing (CN); Yanxue Lin, Beijing (CN)

(73) Assignees: Hefei BOE Vision-Electronic Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 174 days.

(21) Appl. No.: 17/627,770

(22) PCT Filed: Mar. 10, 2021

(86) PCT No.: PCT/CN2021/079853
§ 371 (c)(1),
(2) Date: Jan. 17, 2022

(87) PCT Pub. No.: WO2021/203896
PCT Pub. Date: Oct. 14, 2021

(65) Prior Publication Data
US 2023/0018811 A1    Jan. 19, 2023

(30) Foreign Application Priority Data
Apr. 7, 2020    (CN) .......................... 202010263032.6

(51) Int. Cl.
*H04R 1/02*    (2006.01)
*G06F 1/16*    (2006.01)
*H04R 9/02*    (2006.01)

(52) U.S. Cl.
CPC ........... *H04R 1/025* (2013.01); *G06F 1/1688* (2013.01); *H04R 9/025* (2013.01)

(58) Field of Classification Search
CPC .... H04R 1/025; H04R 9/025; H04R 2499/15; H04R 1/288; H04R 9/06; G06F 1/1688;
(Continued)

(56) References Cited

U.S. PATENT DOCUMENTS 10,999,662 B2 *    5/2021    Morisaki ................ H04R 1/025
11,442,502 B2 *    9/2022    Wang .................... G06F 1/1605
(Continued)

FOREIGN PATENT DOCUMENTS

CN    201398218 Y    2/2010
CN    102917288 A    2/2013
(Continued)

OTHER PUBLICATIONS

CN 202010263032.6 first office action.
PCT/CN2021/079853 international search report and written opinion.

*Primary Examiner* — Angelica M McKinney
(74) *Attorney, Agent, or Firm* — IPro, PLLC

(57) ABSTRACT

The present disclosure provides a rear shell of a display device, including a rear shell body. The rear shell body includes an accommodation cavity for accommodating a loudspeaker, the accommodation cavity has a first opening, the rear shell body further includes a cover plate for blocking the first opening, and the cover plate is provided with a sound outlet hole. The present disclosure further provides the display device. The loudspeaker is accommodated in the accommodation cavity of the rear shell rather than the whole machine, so as to prevent the occurrence of resonance.

9 Claims, 4 Drawing Sheets

(58) Field of Classification Search
CPC ......... G06F 1/1605; H04N 5/642; F16B 1/00; H04B 1/3888; H05K 5/0204; H05K 5/0221
See application file for complete search history.

(56) References Cited

U.S. PATENT DOCUMENTS

| | | |
|---|---|---|
| 2011/0211719 A1 | 9/2011 | Okumura |
| 2016/0044274 A1 | 2/2016 | Wang et al. |
| 2017/0354054 A1* | 12/2017 | Kaplan .................. H04N 5/655 |

FOREIGN PATENT DOCUMENTS

| | | | | |
|---|---|---|---|---|
| CN | 103338602 A | * | 10/2013 | ............... H04N 5/64 |
| CN | 103338602 A | | 10/2013 | |
| CN | 203387605 U | | 1/2014 | |
| CN | 103716723 A | | 4/2014 | |
| CN | 109240209 A | * | 1/2019 | ......... G05B 19/4065 |
| CN | 111474984 A | | 7/2020 | |
| KR | 950008183 Y1 | * | 10/1995 | |

\* cited by examiner

REAR SHELL OF DISPLAY DEVICE AND DISPLAY DEVICE

CROSS-REFERENCE TO RELATED APPLICATIONS

This application is the U.S. national phase of PCT application No. PCT/CN2021/079853 filed on Mar. 10, 2021, which claims a priority of the Chinese patent application No. 202010263032.6 filed on Apr. 7, 2020, the entire contents of which are incorporated herein by reference.

TECHNICAL FIELD

The present disclosure relates to the field of display technology, and in particular to a rear shell of a display device and the display device.

BACKGROUND

At present, most display devices are provided with loudspeakers, and the loudspeaker is fixed inside the whole machine. There are several disadvantages when the loudspeaker is fixed in the whole machine. 1. A part of a sound from the loudspeaker is absorbed by a space inside the whole machine. 2. A large cavity is formed inside the whole machine, resulting in resonance. 3. A sound output rate of the loudspeaker is not high.

SUMMARY

An object of the present disclosure is to provide a rear shell of a display device and the display device so as to solve the above-mentioned problems.

In a first aspect, the present disclosure provided in some embodiments a rear shell of a display device, including a rear shell body. The rear shell body includes an accommodation cavity for accommodating a loudspeaker, the accommodation cavity has a first opening, the rear shell body further includes a cover plate for blocking the first opening, and the cover plate is provided with a sound outlet hole.

In a possible embodiment of the present disclosure, the rear shell body includes a bottom plate and a first side wall located on a side surface of the bottom plate, the accommodation cavity is located in an inner side surface of the first side wall, the first opening of the accommodation cavity is oriented toward the first side wall, and a second opening is formed in a first region of the first side wall opposite to the first opening of the accommodation cavity so that the accommodation cavity is in communication with an external environment, and the cover plate is inserted into the second opening to block the first opening.

In a possible embodiment of the present disclosure, the cover plate blocks the accommodation cavity, and an outer side surface of the cover plate is located on a same plane as an outer side surface of the first side wall.

In a possible embodiment of the present disclosure, the accommodation cavity includes: a first connection wall and a second connection wall both connected to the first side wall and arranged opposite to each other, the first connection wall and the second connection wall being both connected to the bottom plate; a third connection wall arranged opposite to the bottom plate, arranged between the first connection wall and the second connection wall, and connected to the first side wall; and a fourth connection wall arranged opposite to the first side wall, and arranged among the first connection wall, the second connection wall, the third connection wall and the bottom plate.

In a possible embodiment of the present disclosure, the fourth connection wall is provided with a plurality of fixation columns extending in a direction from the fourth connection wall to the first opening, a first groove is formed in a surface of each fixation column away from the fourth connection wall, and a fastener is provided in the first groove to fix the cover plate.

In a possible embodiment of the present disclosure, the fastener is a bolt, an inner side wall of the first groove is provided with an internal thread matching an external thread of the bolt, the cover plate is provided with a plurality of through holes corresponding to the plurality of the fixation columns respectively, and the bolt passes through each through hole so as to cooperate with the corresponding fixation column to fix the cover plate to the accommodation cavity.

In a possible embodiment of the present disclosure, each fixation column is provided on the fourth connection wall at a position close to the bottom plate, a slot is formed in an inner side wall of the second opening in the first side wall, and the cover plate is provided with a clip engaged with the slot to clamp the cover plate onto the second opening.

In a possible embodiment of the present disclosure, at least one of the fourth connection wall, the first connection wall and the second connection wall is provided with a wire outlet hole for allowing a connection wire of the loudspeaker to pass therethrough.

In a possible embodiment of the present disclosure, the third connection wall is provided with a fixation member for fixing a loudspeaker support, the fixation member includes a hollow boss arranged at one end of the third connection wall close to the fourth connection wall, an insertion hole is formed in a surface of the hollow boss away from the third connection wall, and an elastic connection portion of the loudspeaker support is elastically deformed so as to be inserted into the insertion hole and fixed in the hollow boss.

In a second aspect, the present disclosure provides in some embodiments a display device including the above-mentioned rear shell.

In a possible embodiment of the present disclosure, the display device includes a loudspeaker arranged in the accommodation cavity, and a buffering foam is arranged between the loudspeaker and the cover plate.

In a possible embodiment of the present disclosure, the loudspeaker includes a loudspeaker support and a horn magnet steel arranged at a first end of the loudspeaker support, and the buffering foam is arranged between a second end of the loudspeaker support opposite to the first end and the cover plate.

DETAILED DESCRIPTION

Figure 1:
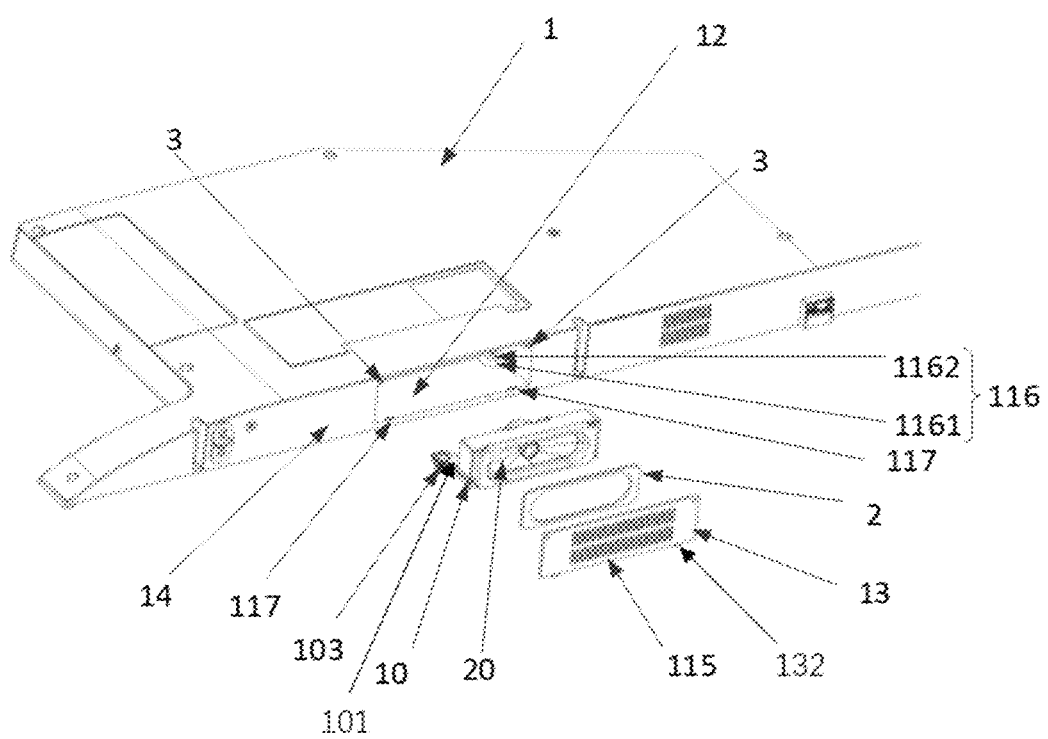
FIG. 1 is an assembly view of a rear shell and a loudspeaker according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

It should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

The present disclosure provides in some embodiments a rear shell of a display device which, as shown in FIGS. 1-4, includes a rear shell body 1. The rear shell body 1 includes an accommodation cavity 12 for accommodating a loudspeaker 10, the accommodation cavity 12 has a first opening 121, the rear shell body further includes a cover plate 13 for blocking the first opening 121, and the cover plate 13 is provided with a sound outlet hole 115 for allowing a sound to pass therethrough.

As compared with the related art where the loudspeaker 10 is arranged inside the whole machine, in the embodiments of the present disclosure, the rear shell body 1 is provided with the accommodation cavity 12 for accommodating the loudspeaker 10, so it is able to reduce an accommodation space for the loudspeaker 10. After the first opening 121 of the accommodation cavity 12 is blocked by the cover plate 13, the sound from the loudspeaker 10 passes through the sound outlet hole 115 in the cover plate 13 but not enters the interior of the whole machine. In this way, the loudspeaker 10 is separated from the whole machine, so as to prevent the occurrence of resonance.

In the embodiments of the present disclosure, the loudspeaker 10 in the accommodation cavity 12 may be a single-body loudspeaker with a low price. The loudspeaker 10 is accommodated in the accommodation cavity 12 and separated from the whole machine, so it is able to achieve an effect of a box-type loudspeaker through the single-body loudspeaker, thereby to improve the sound quality and reduce the manufacture cost.

In the embodiments of the present disclosure, the rear shell body 1 includes a bottom plate 11 and a first side wall 14 located on a side surface of the bottom plate 11, the accommodation cavity 12 is located in an inner side surface of the first side wall 14, the first opening 121 of the accommodation cavity 12 is oriented toward the first side wall 14, and a second opening 141 is formed in a first region 142 of the first side wall 1 opposite to the first opening 121 of the accommodation cavity 12 so that the accommodation cavity 12 is in communication with an external environment, and the cover plate 13 is inserted into the second opening 141 to block the first opening 121.

When the second opening 141 corresponding to the first opening 121 is formed in the first side wall 14 and the cover plate 13 is inserted into the second opening 141 to block the first opening 121 the sound from the loudspeaker 10 may pass through the second opening 141 to the outside.

It should be appreciated that, when the display device is placed normally, namely a display screen faces a user, the first side wall 14 is located at a bottom of the display device, so as to improve the integrity and appearance of the display device.

It should be appreciated that, apart from the second opening 141 in the first side wall 14, in some embodiments of the present disclosure, the accommodation cavity may also be in communication with the external environment through a third opening formed in the bottom plate 11 of the rear shell body 1 and opposite to the first opening 121.

It should be appreciated that, the word "inner" refers to an inner space of the entire rear shell, and the inner side surface of the first side wall 14 is a side surface of the first side wall 14 facing the inner space of the entire rear shell.

The second opening 141 communicates with an interior of the accommodation cavity 12 through the first opening 121. To be specific, the inner side walls of the second opening 141 correspond to the inner side walls of the accommodation cavity 12 respectively, and each inner side wall of the second opening 141 is located in a same plane as a corresponding inner side wall of the accommodation cavity 12, as shown in FIG. 1.

Figure 4:
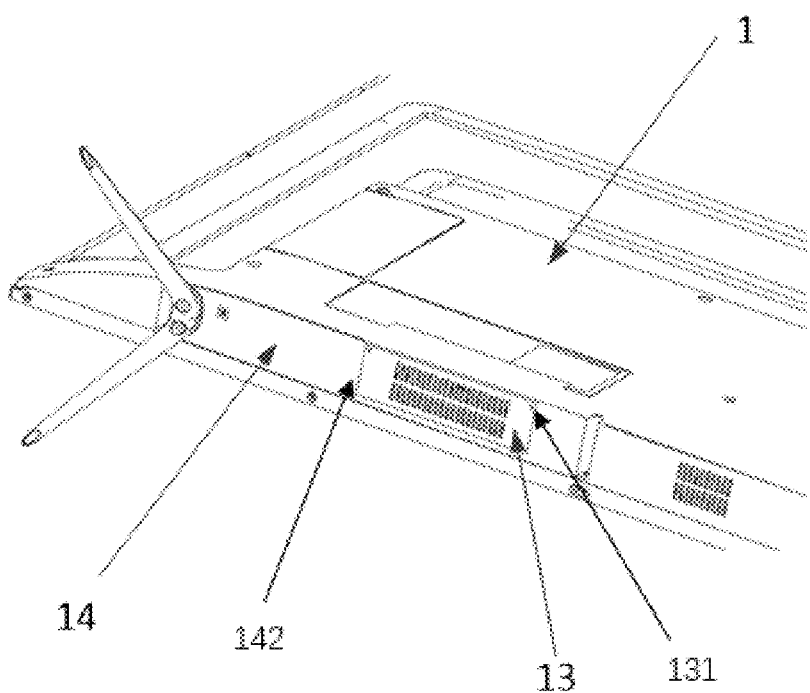
FIG. 4 is a partially schematic view of a rear shell body according to one embodiment of the present disclosure.

To be specific, the cover plate 13 blocks the accommodation cavity 12, and the outer side surface of the cover plate 13 is located in a same plane as the outer side surface of the first side wall 14 to ensure flatness of the rear shell, as shown in FIG. 4.

A size of the second opening 141 may be set according to the practical need. In a possible embodiment of the present disclosure, an area of the second opening 141 is the same as an area of the first opening 121.

In some embodiments of the present disclosure, the accommodation cavity 12 is arranged separately from the rear shell body 1, and in some other embodiments of the present disclosure, the accommodation cavity 12 is formed integrally with the rear shell body 1 to simplify the manufacturing process.

Figure 2:
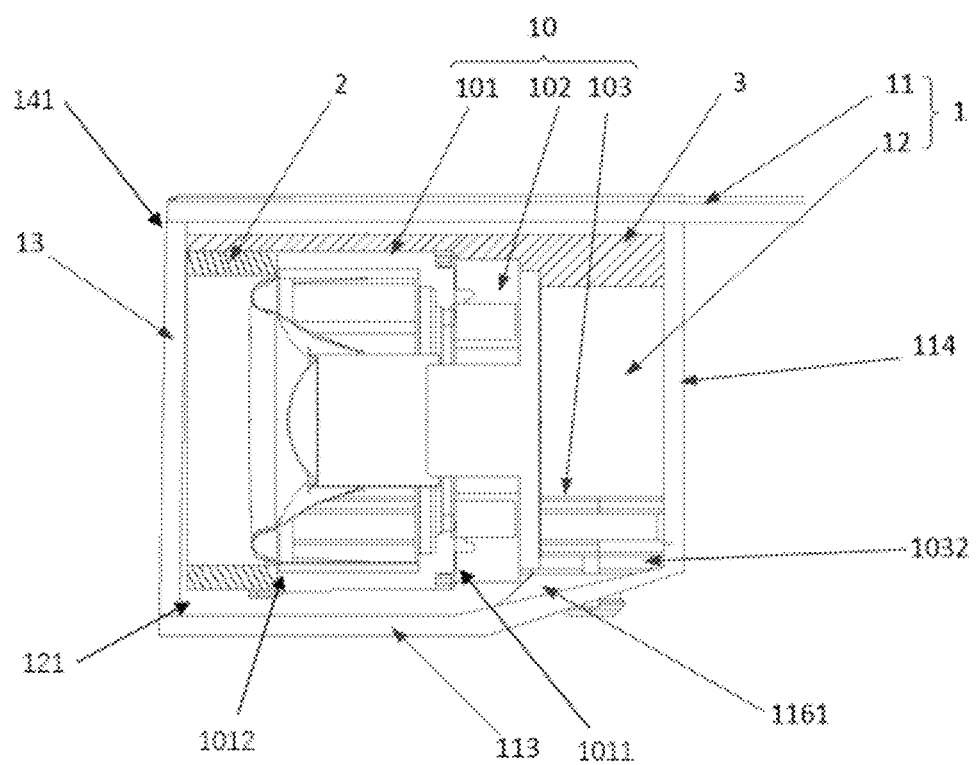
FIG. 2 is a schematic view showing the accommodation of the loudspeaker in an accommodation cavity according to one embodiment of the present disclosure.
Figure 3:
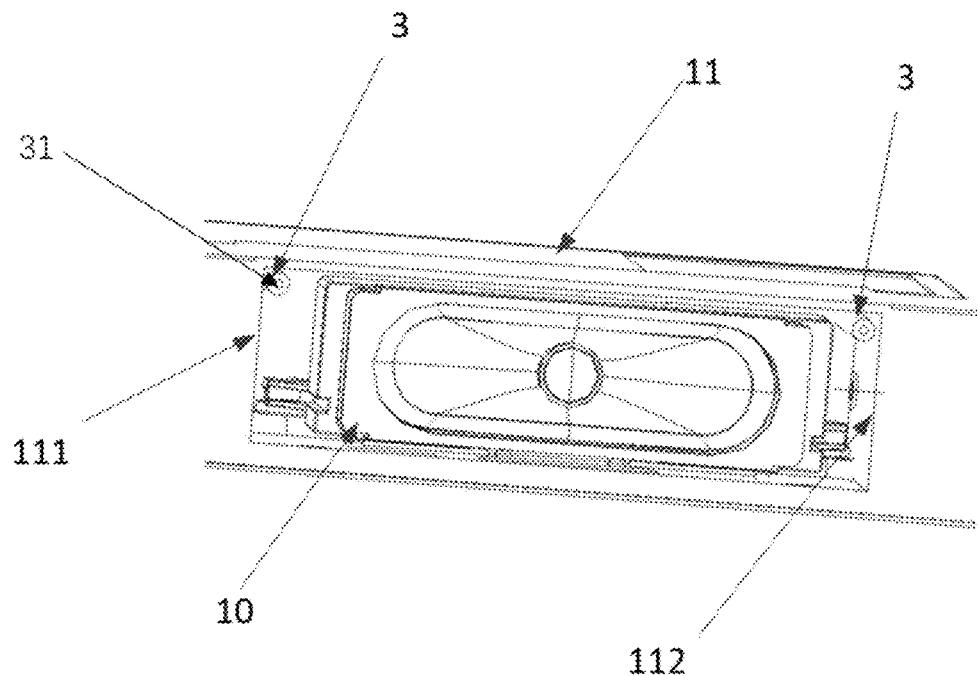
FIG. 3 is another schematic view showing the accommodation of the loudspeaker in the accommodation cavity according to one embodiment of the present disclosure.

As shown in FIGS. 2 and 3, in the embodiments of the present disclosure, the accommodation cavity 12 includes a first connection wall 111 and a second connection wall 112 both connected to the first side wall 14 and arranged opposite to each other, the first connection wall 111 and the second connection wall 112 being both connected to the bottom plate 11; a third connection wall 113 arranged opposite to the bottom plate 11, arranged between the first connection wall 111 and the second connection wall 112, and connected to the first side wall 14; and a fourth connection wall 114 arranged opposite to the first side wall 14, and arranged between the first connection wall 111 and the second connection wall 112, and between the third connection wall 113 and the bottom plate 11.

A part of the bottom plate 11 located among the first connection wall 111, the second connection wall 112 and the fourth connection wall 114 serves as a connection wall of the accommodation cavity 12. After the cover plate 13 has blocked the first opening 121, the accommodation cavity 12 may form an accommodation space independent of the inner space of the rear shell, and the loudspeaker 10 may be accommodated in the accommodation space. The sound from the loudspeaker 10 passes through the first opening 121 to the outside of the display device, so it is able to prevent the sound from the loudspeaker 10 from entering the interior of the whole machine, thereby to prevent the occurrence of resonance and improve the sound quality.

The first opening 121 is arranged in the accommodation cavity 12 at one end close to the first side wall 14, namely, the first opening 121 is arranged at ends of the first connection wall 111 and the second connection wall 112 close to the first side wall 14. The first region 142 of the first side wall 14 is located between the first connection wall 111 and the second connection wall 112, and the second opening 141 is formed in the first region 142 to enable the accommodation cavity 12 to communicate with the outside, so as to facilitate the loudspeaker 10 to be accommodated in the accommodation cavity 12 from the first opening 121.

The third connection wall 113 includes a first connection sub-wall and a second connection sub-wall distributed in a direction from the first opening 121 to the fourth connection wall. The first connection sub-wall is coupled to the first side wall 14 and arranged parallel to the bottom plate. The second connection wall is angled relative to the first connection sub-wall, arranged obliquely from one end coupled to the first connection sub-wall to one end connected to the fourth connection wall, as shown in FIG. 2. An area of the fourth connection wall is smaller than an area of the first opening 121. The second connection sub-wall is inclined so as to avoid the other components, thereby to prevent the installation of the other components from being adversely affected.

In the embodiments of the present disclosure, the fourth connection wall 114 is provided with a plurality of fixation columns 3 extending in a direction from the fourth connection wall 114 to the first opening 121 a first groove 31 is formed in a surface of each fixation column 3 away from the fourth connection wall 114, and a fastener 131 is provided in the first groove 31 to fix the cover plate.

There may exist various forms for fixing the cover plate through the fastener 131 and the first groove 31. In a possible embodiment of the present disclosure, an inner side wall of the first groove 31 is provided with an internal thread matching an external thread of the fastener, 131 e.g., a bolt, the cover plate 13 is provided with a plurality of through holes corresponding to the plurality of the fixation columns respectively, and the bolt passes through each through hole so as to cooperate with the corresponding fixation column 3 to fix the cover plate 13 to the accommodation cavity 12, as shown in FIGS. 1 to 4.

The cover plate 13 is a plate-shaped structure so as to block the first opening 121 of the accommodation cavity 12, and the fixation column 3 is provided so as to fix the cover plate 13. A length of the fixation column 3 is not greater than a depth of the accommodation cavity 12, so that the cover plate 13 blocks the first opening 121 of the accommodation cavity 12. In a possible embodiment of the present disclosure, the length of the fixation column 3 is, but not limited to, equal to the depth of the accommodation cavity 12.

The quantity of fixation columns 3 may be set according to the practical need. For example, four fixation columns 3 may be arranged at four corners of the fourth connection wall 114.

In a possible embodiment of the present disclosure, each fixation column 3 is provided on the fourth connection wall 114 at a position close to the bottom plate 114, a slot 117 is formed in an inner side wall of the second opening 141 in the first side wall 14, and the cover plate 13 is provided with a clip 132 engaged with the slot 117 to clamp the cover plate 13 onto the second opening 141.

Specifically, the fixation columns 3 are arranged at two corners of the fourth connection wall 114 close to the bottom plate 11, namely, a first side of the cover plate 13 close to the bottom plate 11 is fixed by the fixation columns 3. In order to improve the connection stability of the cover plate 13, a second side of the cover plate 13 is fixed onto the first side wall 14 through clamping. The slot 117 is formed in the inner side wall of the second opening 141 and the cover plate 13 is provided with the clip 132 capable of being inserted into the slot 117. The clip 132 may be a protrusion protruding from the cover plate. The slot 117 and the clip 132 serve to fix the cover plate 13, and at the same time, stop the cover plate 13 to facilitate the installation of the bolt in the fixation column 3.

It should be appreciated that, the slot 117 may be formed in any inner side wall of the second opening 141. For ease of operation, in a possible embodiment of the present disclosure, the slot 117 is formed in a first inner side wall of the second opening 141 corresponding to the third connection wall 113, as shown in FIG. 1.

In some embodiments of the present disclosure, a protrusion is provided on the inner side wall of the second opening 141 and the slot engaging with the protrusion is formed on the cover plate 13. A specific fixation mode will not be particularly defined herein, as long as it is able to stop and fix the cover plate 13.

In the embodiments of the present disclosure, at least one of the fourth connection wall 114, the first connection wall 111 and the second connection wall 112 is provided with a wire outlet hole 118 for allowing a connection wire of the loudspeaker 10 to pass therethrough.

The connection wire of the loudspeaker 10 is coupled to a main circuit board inside the whole machine. Through the wire outlet hole 118, it is able to facilitate the arrangement of the connection wire of the loudspeaker 10.

Figure 5:
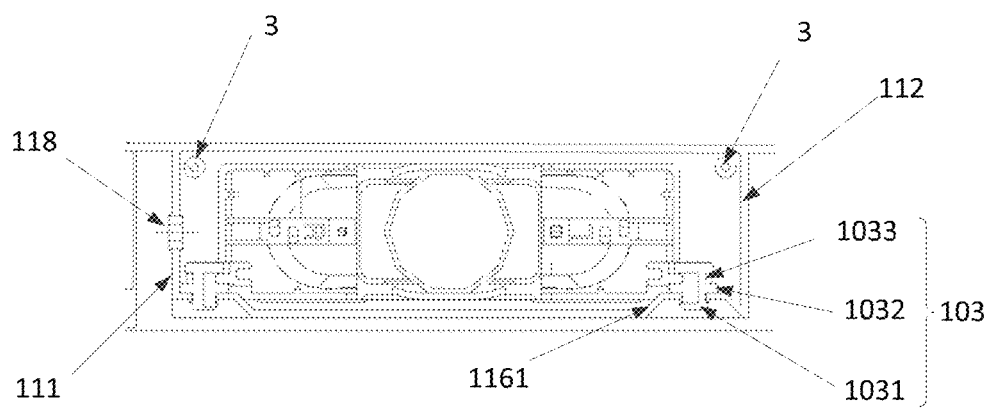
FIG. 5 is a schematic view showing the fixation of the loudspeaker in the accommodation cavity according to one embodiment of the present disclosure.

In FIG. 5, the wire outlet hole 118 is formed in the first connection wall 111, and an extension direction of the wire outlet hole 118 is, but not limited to, perpendicular to the first connection wall 111. A position of the wire outlet hole 118 may be set according to the practical need.

In the embodiments of the present disclosure, the third connection wall 113 is provided with a fixation member 116 for fixing a loudspeaker support 101 the fixation member 116 includes a hollow boss 1161 arranged at one end of the third connection wall 113 close to the fourth connection wall 114, an insertion hole 1162 is formed in a surface of the hollow boss 1161 away from the third connection wall 113, and an elastic connection portion 103 of the loudspeaker support 101 is elastically deformed so as to be inserted into the insertion hole 1162 and fixed in the hollow boss 1161.

The loudspeaker support 101 is provided with the elastic connection portion 103 capable of being inserted into the insertion hole. The elastic connection portion 103 includes a cylindrical plug 1033, and a boss 1031 is arranged at an end of the cylindrical plug 1033. An area of an end face of the boss 1031 close to the cylindrical plug 1033 is greater than an area of a radial cross section of the cylindrical plug 1033, and greater than an area of the insertion hole 1162. An annular protrusion 1032 is protruded from the cylindrical plug 1033 in the middle, an outer diameter of the annular protrusion 1032 is greater than a diameter of the insertion hole 1162, and a distance between the boss 1031 and the annular protrusion 1032 is greater than a depth of the insertion hole 1162. When the elastic connection portion 103 is coupled to the fixation member 116, the boss 1031 deforms so as to be inserted into the insertion hole 1162, and restores to its original state after passing through the insertion hole 1162. The boss 1031 cooperates with the annular protrusion 1032 to fix the loudspeaker support 101 onto the fixation member 116. The fixation member is provided so as to prevent shaking of the loudspeaker 10, thereby to improve the connection stability of the loudspeaker 10, as shown in FIGS. 1, 2 and 5.

The present disclosure further provides in some embodiments a display device including the above-mentioned rear shell.

As compared with the related art where the loudspeaker 10 is arranged inside the whole machine, in the embodiments of the present disclosure, the rear shell is provided with the accommodation cavity 12 for accommodating the loudspeaker 10, the loudspeaker 10 is integrated into the rear shell, so the sound from the loudspeaker 10 passes through the sound outlet hole 115 to the outside. As a result, it is able to prevent the sound from the loudspeaker 10 from entering the interior of the whole machine, thereby to prevent the occurrence of resonance and improve the sound quality. In addition, it is able to achieve a same effect as a box-type horn through a low-price single-body horn.

In the embodiments of the present disclosure, the display device further includes the loudspeaker 10 accommodated in the accommodation cavity 12, and a buffering foam 2 is arranged between the loudspeaker 10 and the cover plate 13.

Through the buffering foam 2, it is able to improve the connection stability of the loudspeaker 10, and protect the loudspeaker 10 in the event of vibration or the like.

A specific structure of the buffering foam 2 may be set according to the practical need. In a possible embodiment of the present disclosure, the buffering foam 2 has an annular structure surrounding the sound outlet hole 115 in the cover plate 13 so as to prevent the sound quality of the loudspeaker 10 from being adversely affected.

In the embodiments of the present disclosure, the loudspeaker 10 includes a loudspeaker support 101 and a horn magnet steel 102 arranged at a first end 1011 of the loudspeaker support 101, and the buffering foam 2 is arranged between a second end 1012 of the loudspeaker support 101 opposite to the first end 1011 and the cover plate 13, as shown in FIGS. 1 and 2.

Generally, the loudspeaker 10 includes a cone 20 arranged on a loudspeaker support 101 and the horn magnet steel 102. The cone 20 is located at the second end 1012, so as to facilitate the generation of the sound.

The display device may be any product or member having a display function, e.g., liquid crystal television, liquid crystal display, digital photo frame, mobile phone or table computer. The display device further includes a flexible circuit board, a printed circuit board and a back plate.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A rear shell of a display device, comprising a rear shell body, wherein the rear shell body comprises an accommodation cavity for accommodating a loudspeaker, the accommodation cavity has a first opening, the rear shell body further comprises a cover plate for blocking the first opening, and the cover plate is provided with a sound outlet hole;

wherein the rear shell body comprises a bottom plate and a first side wall located on a side surface of the bottom plate, the accommodation cavity is located in an inner side surface of the first side wall, the first opening of the accommodation cavity is oriented toward the first side wall, and a second opening is formed in a first region of the first side wall opposite to the first opening of the accommodation cavity so that the accommodation cavity is in communication with an external environment, and the cover plate is inserted into the second opening to block the first opening;

wherein the accommodation cavity comprises: a first connection wall and a second connection wall both connected to the first side wall and arranged opposite to each other, the first connection wall and the second connection wall being both connected to the bottom plate; a third connection wall arranged opposite to the bottom plate, arranged between the first connection wall and the second connection wall, and connected to the first side wall; and a fourth connection wall arranged opposite to the first side wall, and arranged among the first connection wall, the second connection wall, the third connection wall and the bottom plate; wherein the third connection wall is provided with a fixation member for fixing a loudspeaker support, the fixation member comprises a hollow boss arranged at one end of the third connection wall close to the fourth connection wall, an insertion hole is formed in a surface of the hollow boss away from the third connection wall, and an elastic connection portion of the loudspeaker support is elastically deformed so as to be inserted into the insertion hole and fixed in the hollow boss.

2. The rear shell according to claim 1, wherein the cover plate blocks the accommodation cavity, and an outer side surface of the cover plate is located on a same plane as an outer side surface of the first side wall.

3. The rear shell according to claim 1, wherein the fourth connection wall is provided with a plurality of fixation columns extending in a direction from the fourth connection wall to the first opening, a first groove is formed in a surface of each fixation column away from the fourth connection wall, and a fastener is provided in the first groove to fix the cover plate.

4. The rear shell according to claim 3, wherein the fastener is a bolt, an inner side wall of the first groove is provided with an internal thread matching an external thread of the bolt, the cover plate is provided with a plurality of through holes corresponding to the plurality of the fixation columns respectively, and the bolt passes through each through hole so as to cooperate with the corresponding fixation column to fix the cover plate to the accommodation cavity.

5. The rear shell according to claim 3, wherein the each fixation column is provided on the fourth connection wall at a position close to the bottom plate, a slot is formed in an inner side wall of the second opening in the first side wall, and the cover plate is provided with a clip engaged with the slot to clamp the cover plate onto the second opening.

6. The rear shell according to claim 1, wherein at least one of the fourth connection wall, the first connection wall and the second connection wall is provided with a wire outlet hole for allowing a connection wire of the loudspeaker to pass therethrough.

7. A display device, comprising the rear shell according to claim 1.

8. The display device according to claim 7, further comprising the loudspeaker arranged in the accommodation cavity, wherein a buffering foam is arranged between the loudspeaker and the cover plate.

9. The display device according to claim 8, wherein the loudspeaker comprises the loudspeaker support and a horn magnet steel arranged at a first end of the loudspeaker support, and the buffering foam is arranged between a second end of the loudspeaker support opposite to the first end and the cover plate.

\* \* \* \* \*